March 29, 1966  B. PARKER  3,242,742
FRUSTO-CONICAL HYDRODYNAMIC GAS BEARING SUPPORTED GYRO
Filed Nov. 7, 1961  2 Sheets-Sheet 1

Bernard Parker
INVENTOR.

BY
attorneys

March 29, 1966  B. PARKER  3,242,742

FRUSTO-CONICAL HYDRODYNAMIC GAS BEARING SUPPORTED GYRO

Filed Nov. 7, 1961  2 Sheets-Sheet 2

Bernard Parker
INVENTOR.

BY S. A. Giavratana attorneys

United States Patent Office 3,242,742
Patented Mar. 29, 1966

3,242,742
FRUSTO-CONICAL HYDRODYNAMIC GAS BEARING SUPPORTED GYRO
Bernard Parker, Teaneck, N.J., assignor to General Precision, Inc., Little Falls, N.J., a corporation of Delaware
Filed Nov. 7, 1961, Ser. No. 150,752
10 Claims. (Cl. 74—5)

This invention relates to gyroscopes and particularly to gas bearing gyroscopes for use in navigation systems for aircraft, guided missiles, and the like.

A primary object of the invention is to provide a small novel compact gyro having relatively few basic elements which are relatively simple to produce and assemble.

Another object is to provide an improved gyro suitable for installations, in which relatively low cost, a high degree of operating efficiency, and relatively long life are essential requirements.

Another object is to provide a gyroscope capable of high-speed operation for sustained periods.

A further object is to provide a gas-bearing gyroscope which does not require external pressurized gas supplies.

To the fulfillment of these and further objects, the invention contemplates a gyroscope assembly comprising a rotor, a stator, and gas-bearing means mounting said rotor and stator coaxially with respect to one another for relative rotation, said bearing means consisting of complementary frusto-conical bearing surfaces at each end of the rotor and stator disposed with the respective apices of the frusto-conical surfaces oppositely-directed with respect to each other and coaxial with respect to the axis of rotation.

Additional objects of the invention, its advantages, scope and the manner in which it may be practiced will be more fully apparent to persons conversant with the art from the following description of an exemplary embodiment thereof taken in conjunction with the sub-joined claims and the annexed drawings in which like parts are denoted by like reference numerals throughout the several views.

Figure 1:
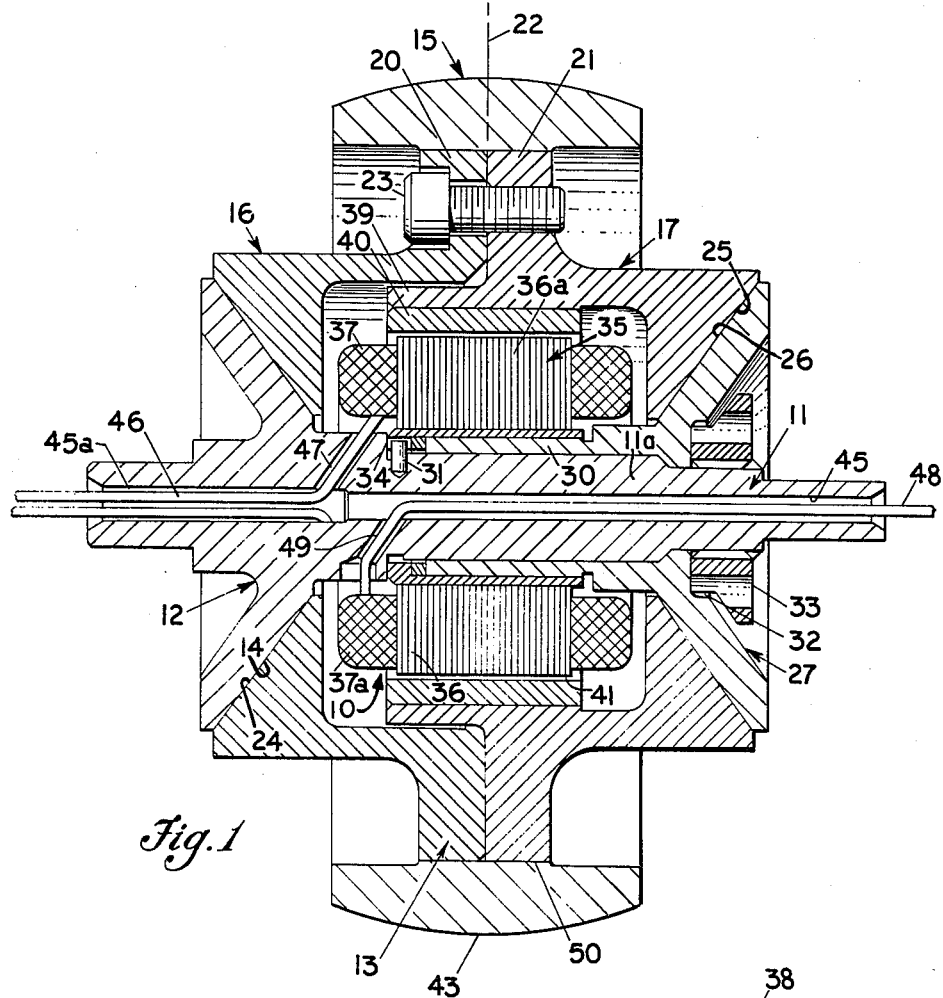
FIGURE 1 is a vertical sectional view along the spin axis of a gyroscope in accordance with the present invention.
Figure 2:
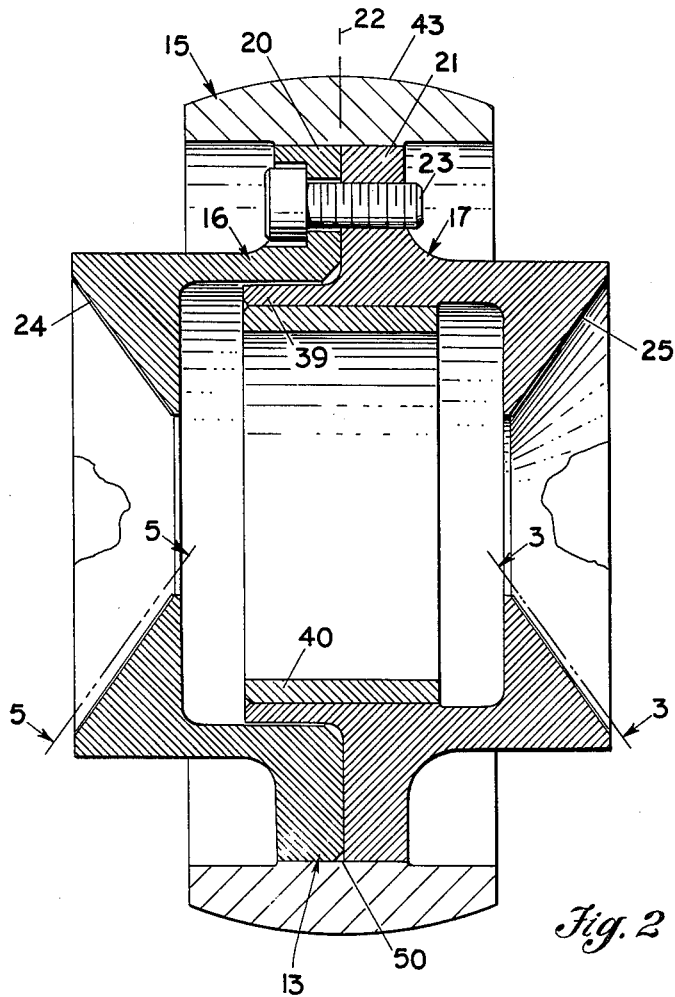
FIGURE 2 is a view similar to FIGURE 1, but showing only the rotor.

One embodiment of the gyro, shown in FIGURES 1 and 2, comprises a central stator 10 supported by a generally tubular shaft 11 having at one end an enlarged, hollow, frusto-conical hub section 12, the outer surface 14 of which forms one of the rotor support bearings in a manner hereinafter described.

A rotor 13 which coaxially surrounds the stator, consists of an annular rim or flywheel 15, formed of brass, gold, or other metal of high specific weight; rim is supported by a pair of flanged hollow cylindrical members 16, 17, made of an aluminum alloy, beryllium or other suitable material to assure maximum dimensional stability. Rotor members 16, 17 have respective annular flanges 20, 21 integral therewith and disposed coaxially about shaft 11 with the flanges in abutment and secured together with a ring of screws (one shown at 23) inserted through openings in one of the flanges, and threaded into registering, tapped holes in the other. The parting line between flanges 20, 21 lies in a plane substantially perpendicular to the longitudinal axis of shaft 11 and substantially coincides with the lateral plane of symmetry 22 of rotor rim 15.

Each of the rotor members 16, 17 has a frusto-conical depression 24, 25 in its external end face. Depression 24 coacts with a complementary surface 14 of hub section 12 at the left-hand end of shaft 11 as viewed in FIGURE 1, to provide one conical rotor bearing; another conical rotor bearing is formed at the opposite end of the shaft by coaction of depression 25 with a complementary surface on a hollow frusto-conical hub 27 coaxially fixed to shaft 11 in a manner hereinafter described.

The removable hub 27 has a thin-wall tubular section 30, which is pressed on or otherwise fitted to an enlarged central segment 11a on shaft 11. A plurality of cylindrical pins 31 lock the tubular section 30 in position on the shaft 11.

A nut 33 threaded onto the right-hand end of shaft 11 bears against an annular flat 32 on removable hub 27 clamping the hub against a shoulder 34 on shaft 11.

Stator 10 includes a laminated core 35 coaxially fixed to tubular section 30 of hub 27 and having a plurality of radially extending poles 36, 36a. A plurality of individual windings 37, 37a are disposed on radial poles 36, 36a of the core in a conventional manner as shown in FIGURE 1.

Rotor member 17 has a coaxial, cylindrical skirt section 39 having press-fitted therein a tubular hysteresis ring 40 which surrounds stator poles 36, 36a and defines therewith annular air gap 41. The magnetic flux lines generated in stator poles 36, 36a by the current flowing through windings 37, 37a react with hysteresis ring 40 in a well-known manner to drive rotor 13 to which it is attached.

The mating frusto-conical surfaces 14, 24, 25 and 26 which are machined, ground, and polished to assure a high degree of alignment, preferably make an angle of approximately 55° relative to the spin axis of the gyro. This angle has been found to give maximum bearing efficiency but may be varied over a wide range to satisfy the requirements of a particular installation. The clearance between coacting, conical bearing surfaces is held to a minimum while avoiding actual contact therebetween while the rotor is rotating.

Figure 4:
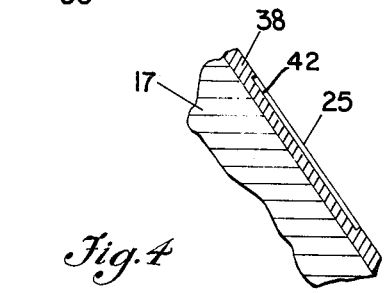
FIGURE 4 is a sectional view on line 4—4 in FIGURE 3.

Frusto-conical surfaces 14, 24, 25 and 26 are coated with a thin facing of a ceramic material 38, as shown in FIGURE 4, in order to provide a hard bearing surface and reduce wear to a minimum.

Figure 3:
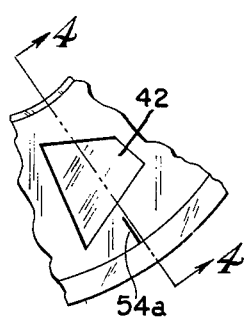
FIGURE 3 is a fragmentary elevational view of a portion of the structure of FIGURE 2, as indicated by line 3—3 thereon.
Figure 5:
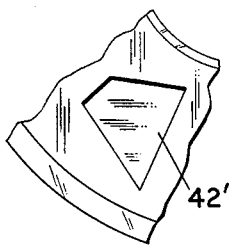
FIGURE 5 is a view similar to FIGURE 3, but indicated by line 5—5 in FIGURE 2.

As shown in FIGURES 3 and 5, each of the frusto-conical faces 24, 25 has a plurality of relatively shallow depressions or pockets 42, 42' of trapezoidal, or other suitable contour cut into the face of the ceramic coating thereof, the depressions being relatively shallow, of the order of .0001" to .00015" deep. The depressions or pockets 42, 42' serve to assist in retaining air or gas, which flows through the gap between the coacting surfaces thus assuring maximum bearing capacity to support the rotor. In the illustrated embodiment there are six equally-spaced pockets 42, 42' in each bearing surface of the rotor; however, a greater or lesser number may be used depending on the diameter of the bearing surfaces. The air or gas filling the gap between the frusto-conical bearing surfaces is drawn into the gap from the surrounding atmosphere by the rotation of the rotor 13, thus providing hydrodynamic gas bearings at both ends of the rotor 13.

In normal operation, rotor 13 turns at speeds of between 12,000 and 24,000 r.p.m., although this would be varied, depending upon the diameter of the flywheel ring, the requirements of a particular installation, and the atmosphere in which the gyro is operated.

The interior 45 of shaft 11, enlarged at one end as at 45a, serves as a conduit for wires 46, 48 leading from an external voltage source to the windings 37, 37a of the stator of the motor. Wires 46, 48 pass through angularly extending connecting passages 47, 49 from the interior of shaft 11 to the stator windings 37, 37a.

The gyro motor may be constructed and connected for three-phase or single-phase operation, depending upon the specific requirements of a particular motor or gyro installation.

Rim 15 has an accurately machined central inner surface portion 50, having a press fit on the circumferential outer surfaces of the flanges 20, 21 of rotor members 16, 17, in order to support the rim in accurate alignment with the frusto-conical rotor bearing faces 24, 25.

Although but one preferred embodiment of the invention has been illustrated and described, it will be apparent to those skilled in the art that many changes may be made in the preferred frusto-conical gas bearing supported gyro as illustrated and described, without departing from the spirit and scope of this invention. Accordingly, this invention is to be considered as being limited only by the following claims appended hereto.

What is claimed is:

1. A gyroscope assembly comprising a rotor; a stator; and bearing means mounting said rotor and stator in coaxial relationship for relative rotation about the common axis, said bearing means consisting of complementary bearing surfaces on said rotor and stator coaxial with said common axis and coacting to define oppositely tapering frusto-conical bearings at the respective ends of said rotor, said bearing surfaces being formed of a hard ceramic material and constructed and arranged to generate therebetween, by reason of relative rotation, a film of gas under pressure serving to lubricate said surfaces.

2. A gyroscope assembly comprising: a rotor of substantially circular cross-section; a stator mounted coaxially within the rotor, said stator including a coaxial cylindrical central section having a stator armature coaxially fixed together; a hysteresis tubular ring of hollow cylindrical form fixedly attached to said rotor and coaxially surrounding said armature at a small radial distance therefrom; bearing surfaces at both longitudinal ends of the rotor, coaxial therewith; bearing surfaces at both ends of the stator, coaxial therewith and complementary to said rotor bearing surfaces, the respective rotor and stator bearing surfaces, coacting to define therebetween a gap for containment of a thin film of gas under pressure generated between the coacting bearing surfaces for rotatably supporting the rotor with respect to the stator.

3. A gyroscope assembly according to claim 2, wherein said bearing surfaces are of frusto-conical form, with apices oppositely directed at opposite ends of the rotor and stator assembly, each frusto-conical bearing surface of both rotor and stator having a hard-surfaced coating thereon.

4. A gyroscope assembly according to claim 3, wherein each of said hard-surfaced coatings has a plurality of shallow pockets therein symmetrically spaced about the axis of rotation of the rotor, said pockets being adapted to store gas under pressure, thereby to enhance a gas bearing support between the bearing surfaces of the rotor and the mating bearing surfaces of the stator.

5. A gyroscope assembly according to claim 1 including a plurality of shallow pockets between said bearing surfaces symmetrically spaced about said common axis, said pockets being adapted to trap gas under pressure and enhance the load-carrying ability of the gas film lubricating said surfaces.

6. A gyroscope assembly according to claim 5 wherein the radial dimension of each of said pockets is greater at one limit of its circumferential extent than at the other.

7. A gyroscope assembly according to claim 1, said rotor including a pair of rotor support members of generally hollow cylindrical configuration disposed in coaxial relation and having confronting, radially-outwardly-extending, annular flanges on their adjacent ends, said flanges being detachably fastened in abutment, and an annular rim coaxially mounted on the outer circumferential edges of said flanges.

8. A gyroscope assembly according to claim 7 wherein the bearing surfaces on said rotor are formed on the respective ends of said rotor support members remote from said flanges.

9. A gyroscope assembly according to claim 8, said stator including a tubular shaft having adjacent one end thereof, a frusto-conical hub portion tapering radially outwardly in the direction of said one end, the outer surface of said hub portion constituting one of said stator bearing surfaces, and a hub member removably secured to the other end of said tubular shaft and having a frusto-conical portion tapering radially outwardly in the direction of said other end of the shaft, the outer surface of the frusto-conical portion of said hub member constituting the other of said stator bearing surfaces.

10. A gyroscope assembly according to claim 2, said stator including a tubular shaft having adjacent one end thereof a frusto-conical hub portion tapering radially outwardly in the direction of said one end, the outer surface of said hub portion constituting one of said stator bearing surfaces; a hub member removably secured to the other end of said tubular shaft and having a frusto-conical portion tapering radially outwardly in the direction of said other end of the shaft, the outer surface of the frusto-conical portion of said hub member constituting the other of said stator bearing surfaces; said rotor including a pair of rotor support members of generally hollow cylindrical configuration coaxially disposed about said tubular shaft and having confronting radially outwardly extending annular flanges on their adjacent ends, said flanges being detachably fastened in abutment, the rotor bearing surfaces being formed on the respective ends of said rotor support members remote from said flanges; and an annular rim coaxially mounted on the outer circumferential edges of said flanges.

References Cited by the Examiner
UNITED STATES PATENTS

| | | | |
|---|---|---|---|
| 2,937,804 | 5/1960 | Reiner et al. | 74—5.7 X |
| 3,027,471 | 3/1962 | Burgwin et al. | 74—5.7 X |
| 3,043,635 | 7/1962 | Bard | 308—9 |
| 3,048,043 | 8/1962 | Slater et al. | 74—5 |
| 3,071,421 | 1/1963 | Jones et al. | 74—5 X |

MILTON KAUFMAN, *Primary Examiner.*

BROUGHTON G. DURHAM, *Examiner.*

T. W. SHEAR, *Assistant Examiner.*